A. S. NOONAN.
BUMPER FOR MOTOR VEHICLES.
APPLICATION FILED SEPT. 3, 1920.
1,435,728.
Patented Nov. 14, 1922.
2 SHEETS—SHEET 1.
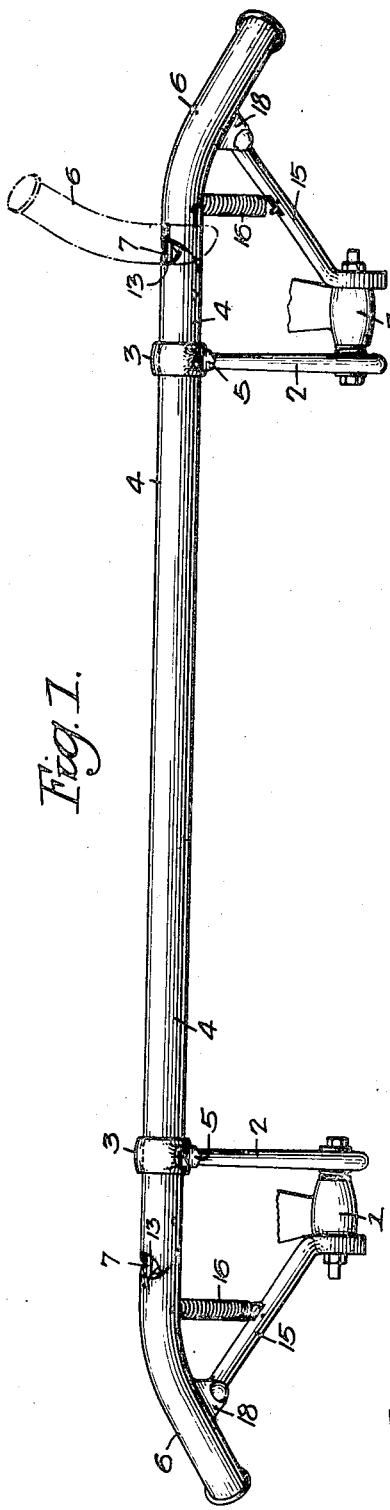
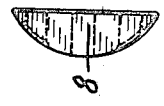
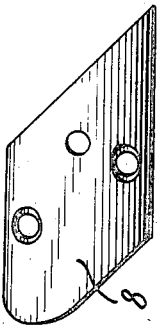
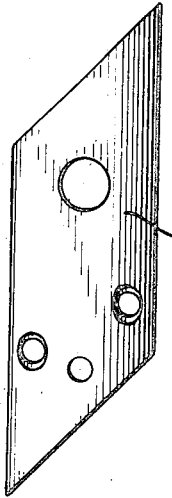
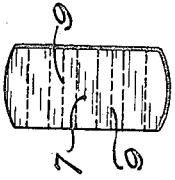
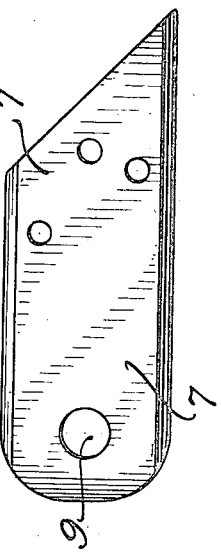
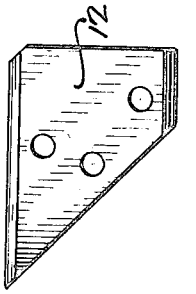
Inventor—
Albert S. Noonan.
by his Attorneys—
Howson & Howson A. S. NOONAN.
BUMPER FOR MOTOR VEHICLES.
APPLICATION FILED SEPT. 3, 1920.
1,435,728.
Patented Nov. 14, 1922.
2 SHEETS—SHEET 2.
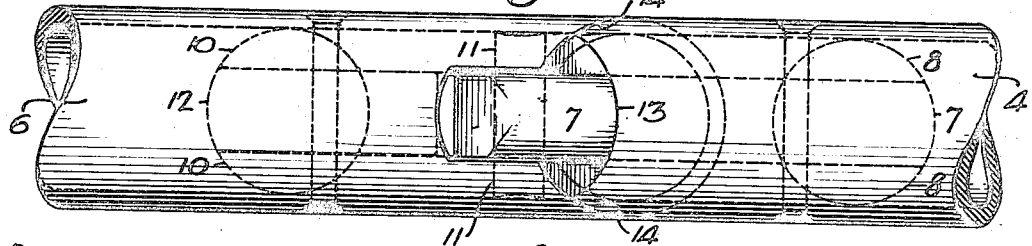
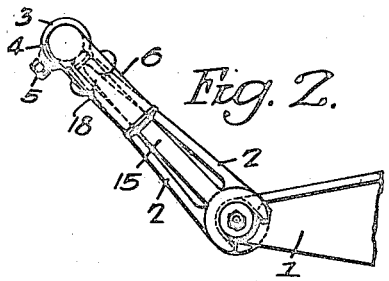
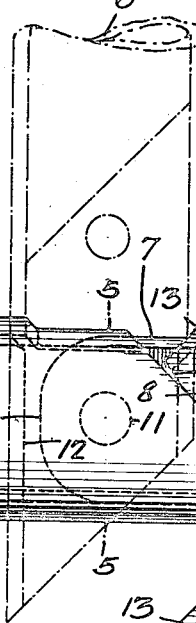
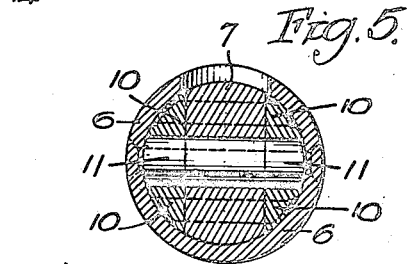
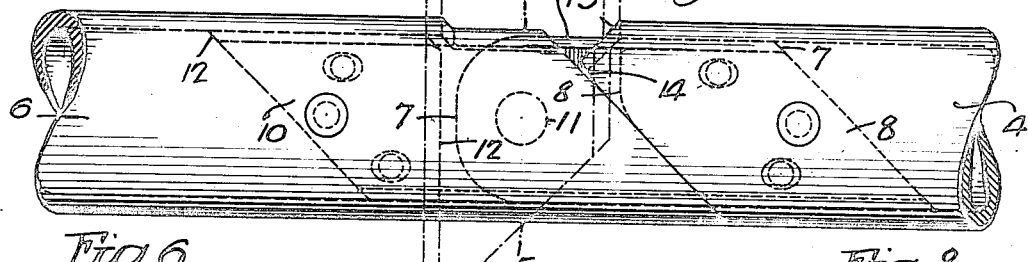
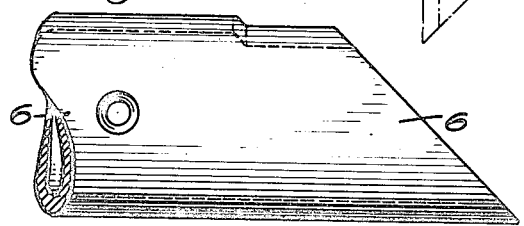
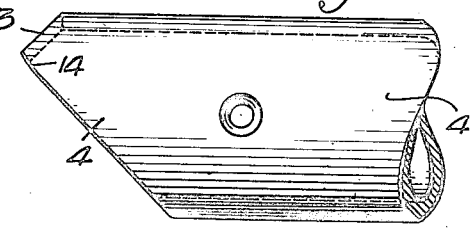
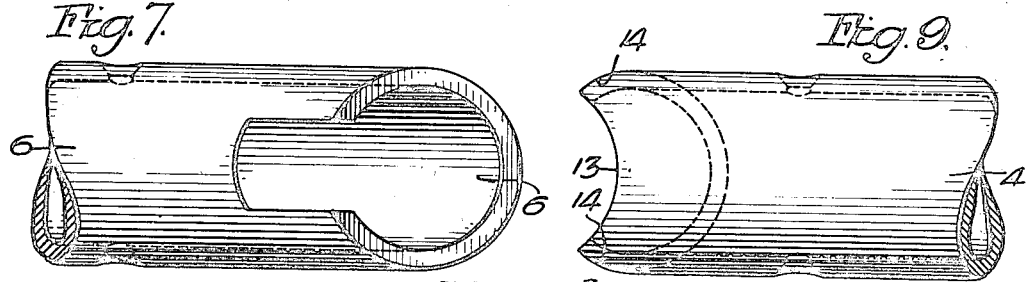
Inventor, Albert S. Noonan
by his Attorneys.

Patented Nov. 14, 1922.

1,435,728

UNITED STATES PATENT OFFICE.

ALBERT S. NOONAN, OF PHILADELPHIA, PENNSYLVANIA, ASSIGNOR TO FOSS-HUGHES COMPANY, OF PHILADELPHIA, PENNSYLVANIA, A CORPORATION OF PENNSYLVANIA AND MASSACHUSETTS.

BUMPER FOR MOTOR VEHICLES.

Application filed September 3, 1920. Serial No. 407,988.

*To all whom it may concern:*

Be it known that I, ALBERT S. NOONAN, a citizen of the United States, residing in Philadelphia, Pennsylvania, have invented Bumpers for Motor Vehicles, of which the following is a specification.

One object of this invention is to provide a motor vehicle bumper of such construction that in the event of its ends becoming engaged with some other structure when the vehicle is backed, injury to said structure as well as to said bumper will be prevented; my invention more especially contemplating a novel form of bumper structure which shall include relatively movable end portions free to yield or swing relatively to the bumper body when brought into engagement with a relatively fixed structure by a backward movement of the vehicle on which they are mounted.

I further desire to provide a novel form of connection between the body and the end portions of a motor vehicle bumper whereby said portions are free to yield in one plane; the invention contemplating auxiliary supporting means for the bumper ends for reinforcing their overhung or outer portions.

These objects and other advantages ends I attain as hereinafter set forth, reference being had to the accompanying drawings, in which, Fig. 1 and Fig. 2 are respectively a plan and an end elevation of a motor vehicle bumper constructed in accordance with my invention;

Figs. 3 and 4 are respectively a plan and a rear elevation of one end of a portion of the bumper body, showing my invention as applied thereto;

Fig. 5 is a transverse vertical section on the line 5—5, Fig. 3;

Figs. 6 and 7 are respectively a plan and a side elevation of the hinged end of one of the bumper end portions;

Figs. 8 and 9 are a plan and a side elevation of the extremity of the body portion connected to the movable end portions of the bumper;

Figs. 10, 11, 12 and 13 are elevations of the detailed parts of one of the hinges or pivotal connection; and Figs. 14, 15, 16 and 17 are end elevations of the structures shown in Figs. 10 to 13 inclusive.

In the above drawings 1—1 represents a portion of a motor vehicle to which a bumper may be attached, in the present instance the forward end of a side frame member, and each of these has clamped to it a forwardly and upwardly projecting arm 2 carrying at its free extremity a bearing head 3 for the reception of a bumper body 4 in the shape of a transversely extending pipe or tube rigidly held in said heads by clamping screws 5.

This body has hinged or pivotally connected to its extremities rearwardly curved and structurally independent end portions 6 so mounted that they cannot swing up, down or back although they are free to swing in a horizontal plane forwardly of the bumper body in case they engage some fixed structure when the vehicle on which the bumper is mounted is moved backwardly. For this purpose each end of the bumper body is cut at an angle of about 45 deg. to its center line, and the cooperating extremity of the curved end section 6 is likewise cut or bevelled at substantially the same angle, as well as inwardly recessed or slotted at the top.

A hinged member in the form of a plate 7 (Figs. 13 and 17) is fixedly mounted in each extremity of the body section 4 between a pair of plates 8 (Figs. 11 and 15), each of which has its outer end bevelled to approximately correspond to the bevel of the end of the body section, in addition to which one of its faces is plane for engagement with the similar flat face of the plate 7, while its other side is circularly curved to snugly fit the interior of the pipe constituting said body.

In the present case the plate 7 with its two side plates 8 are riveted in the end of the body section 4 in such positions that said plate 7 which has a pivot opening 9, projects beyond said end. Each of the end sections 6 of the bumper has mounted in it a pair of plates 10—10, each having one end cut on an incline or bevelled to correspond in form with the inclined end of said bumper section and likewise has one face flat and the other or opposite side cylindrically curved so as to snugly fit the interior of the section 6. The space between these two plates 10 is such as to be snugly fitted by the projecting end of the plate 7 which is pivotally connected to them by a pin 11 whose length (as shown in Fig. 5) is substantially equal to the internal diameter of the section 6 in which it extends. The spacing of the two plates 10 is maintained by a third plate 12 mounted between their rear portions and with them rigidly connected to the bumper section 6 by rivets or other equivalent means.

It is noted that the front and relatively sharp edge of each end of the bumper body 4 is cut off substantially at right angles to its inclined portion as indicated at 13 and the adjacent part of said inclined extremity is slightly curved as indicated at 14 (Fig. 3), so that the end section 6 may turn about the pivot 11 when a force is applied to move it forwardly into the position shown in dotted lines in Fig. 1. At the same time, neither of the end sections can move rearwardly on its pivot, owing to the engagement of its inclined end and also of the inclined end of its plates 10 with the cooperating end of the body section 4 and of the plates 8 mounted therein.

As a consequence of the above construction, the bumper is free to perform its desired function, viz,—to protect the front or rear portions of the vehicle from engagement with objects engaged by the front or forward face or side of said bumper. On the other hand, in case while the vehicle is backing, either of the end sections 6 (which are preferably rearwardly curved) should engage some fixed or relatively stationary structure, it is free to swing on its pivot 11, thus preventing damage to the bumper and to the object engaged thereby.

If desired, I may provide an auxiliary support for each of the end sections 6 so that the stresses occurring when it is brought into engagement with a fixed object while moving forward, are transferred directly to the frame of the vehicle, rather than through the hinge or pivotal connection to the body 4 and arms 2. For this purpose I connect a yoke piece or forked structure 18 to each of the sections 6 as by spot welding, and pivot to each of said pieces one end of a strut in the form of an arm 15 whose opposite end is preferably forked or otherwise shaped to bear against the frame structure 1, in which position it is normally maintained by a spring 16 extending between it and a portion of the bumper. Since the forked end of the strut 15 loosely engages the frame structure 1, the end section 6 to which it is attached is as before free to swing forwardly on its pivot but is strongly braced by said strut in a manner to effectively resist a force tending to swing said end section back. When the section 6 is forced to its forward position as indicated in dotted lines in Fig. 1, the spring 16 acts to draw the strut 15 into a position more nearly parallel with said section, keeping it from swinging outwardly.

I claim:—

1. The combination of a vehicle bumper consisting of a body portion and end sections hinged thereto; means for supporting said body portion from a vehicle; and auxiliary means for independently supporting said end sections.

2. The combination of a vehicle bumper consisting of a body portion and end sections hinged thereto; means for supporting said body portion from a vehicle; and members connected respectively to the end sections and formed to separably engage portions of the vehicle.

3. The combination of a vehicle bumper consisting of a body portion and end sections hinged thereto so as to be free to swing forwardly of said body portion; said sections being formed to be held by said portion from rearward movement; with auxiliary means for preventing such rearward movement.

4. The combination of a vehicle bumper, consisting of a body portion having its extremities formed at an angle; with end sections hinged to said body portion and having their ends adjacent thereto also formed at an angle to co-act with the angular extremities of said body portion to permit them to swing forwardly of the body section while preventing their rearward movement.

5. The combination in a vehicle bumper of a body portion having bevelled extremities and end sections pivoted to said extremities and also having their coacting ends bevelled; the beveled portions of said end preventing rearward movement of the end sections on their pivots while permitting their forward movement.

6. The combination in a vehicle bumper of a body portion having bevelled extremities and end sections pivoted to said extremities and also having their coacting ends bevelled; means for preventing rearward movement of the end sections on their pivots while permitting their forward movement; with auxiliary devices for supporting said end sections independently of the body portion.

7. The combination of a vehicle bumper having a body and end sections hinged thereto; with arms formed to engage the vehicle in positions to prevent rearward swinging of the end sections.

8. The combination of a vehicle bumper consisting of a body portion and end sections hinged thereto; arms respectively extending between said end sections and the vehicle; with springs acting between each of said arms and the adjacent portion of the bumper.

9. The combination of a vehicle bumper including a body portion and end sections; means for movably connecting said end sections to the body consisting of plates respectively fixed in the ends of the body and extending into the adjacent portions of the end sections; and pivot pins in said end sections engaging said plates.

10. The combination in a vehicle bumper of a body and end sections; and means for connecting said body to each of the end sections consisting of a pair of spaced plates and a projecting hinge member for one of the elements comprised by the body and an end section, and two spaced plates fixed in the other of said elements; with a pivot pin extending through the projecting plate of one element and into the spaced plates of the other element.

11. A vehicle bumper consisting of a body section having its extremities inclined, and end sections having inclined extremities cooperating with the extremities of the body; plates fixed in the extremities of the body and extending into the extremities of the end sections respectively; with pivot pins fixed within the end sections and engaging said plates of the body sections in positions to permit forward swinging of the end sections while preventing rearward movement thereof.

ALBERT S. NOONAN.